United States Patent
Regensburger

(10) Patent No.: US 11,226,477 B2
(45) Date of Patent: Jan. 18, 2022

(54) METHOD FOR PRESENTING IMAGES OF A DIGITAL SURGICAL MICROSCOPE AND DIGITAL SURGICAL MICROSCOPE SYSTEM

(71) Applicant: Carl Zeiss Meditec AG, Jena (DE)

(72) Inventor: Alois Regensburger, Poxdorf (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 15/806,378

(22) Filed: Nov. 8, 2017

(65) Prior Publication Data

US 2018/0136450 A1 May 17, 2018

(30) Foreign Application Priority Data

Nov. 16, 2016 (DE) ...................... 10 2016 122 004.3

(51) Int. Cl.
*H04N 5/232* (2006.01)
*A61B 1/045* (2006.01)
(Continued)

(52) U.S. Cl.
CPC ....... *G02B 21/365* (2013.01); *G02B 21/0012* (2013.01); *H04N 5/23222* (2013.01); *H04N 5/23296* (2013.01); *G02B 21/025* (2013.01)

(58) Field of Classification Search
CPC ....... A61B 3/1176; A61B 50/10; A61B 50/13; A61B 50/15; A61B 5/0013; A61B 5/0042; A61B 5/0059; A61B 5/0064; A61B 5/077; A61B 5/0261; A61B 5/06; A61B 5/065; A61B 5/066; A61B 5/107; A61B 5/1077; A61B 5/1079; A61B 5/14546; A61B 5/14553; A61B 5/14556; A61B 5/1459; A61B 5/1495; A61B 5/4504; A61B 5/684; A61B 5/6844; A61B 5/7264; A61B 5/745;
(Continued)

(56) References Cited

U.S. PATENT DOCUMENTS

| 6,559,888 B1 * | 5/2003 | Doron | H04N 5/23212 348/240.1 |
| 2011/0242008 A1 * | 10/2011 | Almeida | H04N 21/44218 345/173 |

(Continued)

FOREIGN PATENT DOCUMENTS

| AU | 2012 227 252 | 4/2013 |
| DE | 10 2015 216 573 | 9/2016 |
| EP | 2 335 551 | 6/2011 |

OTHER PUBLICATIONS

German Office Action for 10 2016 122 004.3 dated Aug. 10, 2017.

*Primary Examiner* — Samuel D Fereja
(74) *Attorney, Agent, or Firm* — Nixon Peabody LLP; Jeffrey L. Costellia

(57) ABSTRACT

The invention relates to a method for recording and providing digital images using a digital surgical microscope system. The method includes recording magnified video image of an object region by an image sensor in the image recording unit. The method also includes displaying, on a digital display unit, in at least certain regions, the image recorded by the image sensor. A magnification of the image displayed on the digital display unit is adjusted by a limit value of the magnification. The limit value of the magnification is set using situative parameters to determine an optimum magnification.

13 Claims, 3 Drawing Sheets

(51) Int. Cl.
*G02B 21/36* (2006.01)
*G02B 21/00* (2006.01)
*G02B 21/02* (2006.01)

(58) Field of Classification Search
CPC ....... A61B 6/037; A61B 6/501; A61B 8/0808; A61B 8/13; A61B 8/461; A61B 8/467; A61B 8/468; A61B 8/5261; A61B 90/30; A61B 90/90; A61B 90/92; A61B 90/94; G02B 21/0012; G02B 21/22; G02B 2027/0138; G02B 21/368; G02B 21/365; G02B 27/0172; G02B 21/361; G02B 27/017; G02B 2027/014; G02B 2027/0187; G02B 2027/0178; G02B 21/362; G02B 2027/0134; G02B 21/367; G02B 27/0093; G02B 27/0101; G02B 21/16; G02B 21/20; G02B 27/01; G02B 17/08; G02B 2027/0141; G02B 2027/0147; G02B 2027/0154; G02B 21/364; G02B 25/004; G02B 27/0179; G02B 27/022; G02B 27/026; G02B 27/2228; G02B 27/2264; G02B 27/26; G02B 7/1822; G02B 15/02; G02B 2027/011; G02B 2027/0123; G02B 2027/0132; G02B 2027/0156; G02B 2027/0169; G02B 2027/0181; G02B 21/008; G02B 21/025; G02B 21/04; G02B 21/24; G02B 21/36; G02B 2207/113; G02B 23/12; G02B 23/2407; G02B 23/2415

See application file for complete search history.

(56) References Cited

U.S. PATENT DOCUMENTS

| | | |
|---|---|---|
| 2015/0173846 A1 | 6/2015 | Schneider et al. |
| 2016/0183779 A1 | 6/2016 | Ren et al. |
| 2018/0104018 A1* | 4/2018 | Ootsuki ............... A61B 90/20 |
| 2018/0263710 A1* | 9/2018 | Sakaguchi ............ A61B 34/70 |
| 2018/0344413 A1* | 12/2018 | Rappel ................ G02B 21/365 |

* cited by examiner

METHOD FOR PRESENTING IMAGES OF A DIGITAL SURGICAL MICROSCOPE AND DIGITAL SURGICAL MICROSCOPE SYSTEM

The invention relates to a method for presenting images that have been recorded by means of a digital surgical microscope. The invention also comprises a digital surgical microscope system in which the method according to the invention is realized.

Digital images that have been recorded by a surgical microscope are usually viewed by a user, for example a doctor carrying out a surgical operation, by means of a display device, for example a monitor, digital binoculars or a head-mounted display. If the display device has a high display resolution, but is too far away from the user, the user cannot make out all of the details of the object presented on the monitor because of his restricted eyesight.

A similar problem is known in the area of digital cameras: Digital cameras generally include an optical zoom function, which enables the user to take photos of objects with a desired magnification. However, the user then possibly cannot make out all of zo the details that are presented on the monitor since the pixel density on the monitor is very high and the user views the monitor from too great a distance to make out all of the details that have been resolved by the optical zoom and the image sensor. For these cases in which the built-in optical zoom in the digital camera is not sufficient to present the object to be photographed in a sufficient size on the monitor, the user is provided with what is known as a digital zoom function, which allows further magnification of the object in the photo. While, however, when using the optical zoom the lenses in the lens system move and change the image angle while utilizing the full format of the camera image sensor, whereby the quality of the image remains at the same high level over the entire optical zoom range, when using the digital zoom the lens system is brought to its maximum telescopic setting and a smaller region of the image sensor is used for recording the image. This image is subsequently converted to the original size (and number of pixels), in order to achieve the same scale of magnification as when using a stronger telephoto lens. The greater the digital zoom setting, the smaller the region of the image sensor that is used, so that the quality of the image keeps decreasing.

Use of a digital zoom does not allow any additional image information, i.e. knowledge of smaller details of the object in the photo, to be obtained. To achieve an image quality that is as high as possible, therefore, first the optical zoom of the camera is brought to the maximum telescopic setting and then—if necessary—the digital zoom is additionally activated.

A similar method is known for the Kodak EasyShare LS633 digital camera: There, a method known as the "Advanced Digital Zoom" is used, a method in which first the optical zoom is set to the maximum magnification and then optionally a digital zoom can be additionally activated by the user if this optical zoom is insufficient.

Many digital cameras therefore have a two-stage zoom method, in which first an internal optical zoom in the camera is set to the maximum magnification and then if need be the image is digitally re-magnified. This gives the user the possibility of using the digital zoom to magnify small details until they are of sufficient size on the monitor for the user to see them. However, it is in this case relatively laborious and difficult for the user to find precisely that overall magnification with which he can make out the details with the optimum magnification. Adjusting the zoom too little means that the user cannot make out the entire detailed information of the object on the monitor even though this information was registered by the digital image recording device. Adjusting the digital zoom into the image too much means however that there is very quickly a noticeable loss of image quality, and the image looks unsharp and blurry.

The object of the present invention is therefore to provide a method and a device that assists the user in setting a suitable overall magnification of a digital microscope system. In particular, the intention is for it to be easily possible to set that overall magnification with which the user can still just visually perceive the smallest object details resolved by the digital image recording unit without a loss of quality already being caused by the digital zoom.

This object is achieved by a method and a device having the features of the independent claims. The subclaims concern advantageous developments and variants of the invention.

A method according to the invention for presenting images that have been recorded by means of a digital surgical microscope system uses situative parameters to present the images with suitable magnification. For this purpose, an image is produced on an image sensor by means of an image recording unit, and this image is reproduced for a user, at least in certain regions, on a display unit. The magnification of the image reproduced is then increased by electronic means, using a limit value of the magnification in the determination of which the aforementioned situative parameters are incorporated. Increasing the magnification of the image reproduced by electronic means is understood as meaning measures with which the magnification of the image on the image sensor does not change, that is to say in particular measures with which there is no optical zoom.

For the purposes of the present invention, situative parameters are parameters that arise from the respective application situation of the surgical microscope.

A distance of a user from the display unit may be used in particular as an example of situative parameters. In this way it can be estimated in advance which magnification of the image is best suited to provide the user with the optimum information about the smallest structures that can be resolved by the digital microscope.

Furthermore, it is useful for example when choosing a suitable magnification to include the vision (i.e. the visual acuity) of the user. If, for example, the user has greatly restricted vision, a presentation of very small details on the display unit cannot be used to its full extent since, with his poor visual acuity, the user cannot resolve the details. In this case, the situative parameters do not just comprise the application situation, independently of the respective user, but also include user-specific parameters—in the example described the visual acuity of the user—in the setting of the limit value.

In an advantageous refinement of the invention, a method in which an optical zoom followed by a digital zoom is carried out is proposed. For this purpose, first the limit value of the magnification is determined and then an optical zoom factor of the image recording unit is increased iteratively until its maximum value is reached. Subsequently, a digital zoom factor is additionally activated and is increased iteratively until the image reproduced on the display unit is presented with an overall magnification that corresponds to the limit value of the magnification.

Exemplary embodiments and variants of the invention will be explained in more detail below with reference to the drawing. In the figures.

Figure 1:
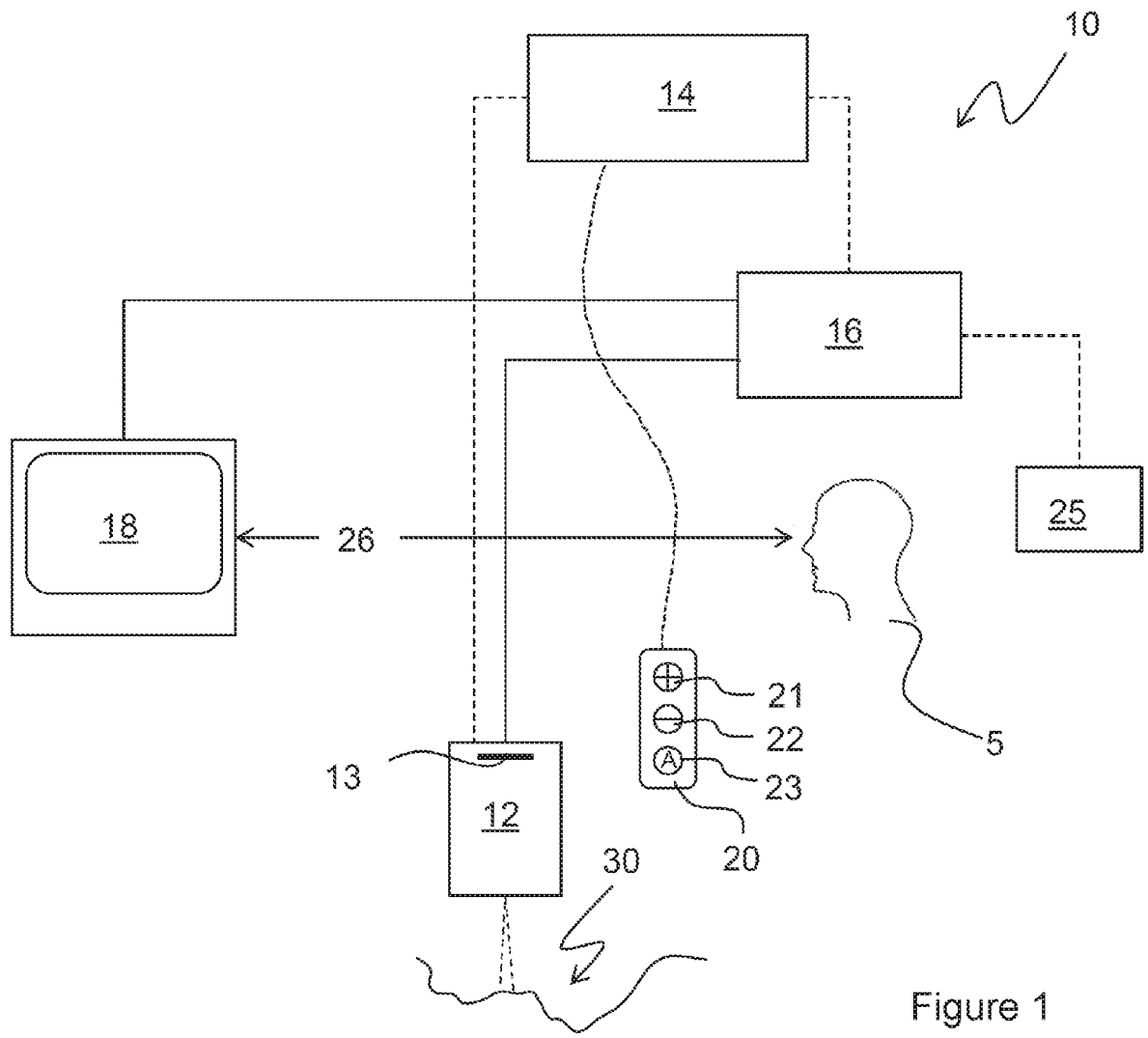
FIG. 1 shows a schematic representation of a surgical microscope system with a control device, which allows images recorded to be presented according to the invention.

FIG. 1 shows a digital surgical microscope system 10 with a user 5, who is viewing on a digital display unit 18, for example a monitor, a magnified video image of an object region 30 generated by the surgical microscope system 10. The surgical microscope system 10 comprises a recording unit 12, which monoscopically or stereoscopically records a magnified video image of the object region 30, and an adjustable optical zoom (not shown in FIG. 1), which allows a movement of optical components, in particular lenses, in the recording unit 12 and makes it possible to change the image section while utilizing the full format of an image sensor 13 (or a number of image sensors 13) of the recording unit 12. A control device 14 of the surgical microscope system 10 controls or regulates operating parameters of the surgical microscope system 10, in particular the optical zoom factor, the position of diaphragms within the recording unit and other parameters.

A video data processing unit 16 converts the digital/electronic signal of the image sensor 13 in the recording unit 12 into a digital video signal, which is reproduced by the digital display unit 18, for example a 2D or 3D monitor. The video data processing unit 16 is in this case capable of digitally magnifying an image section from the video signals of the image sensor 13 ("digital zoom") and interpolating it appropriately, so that for example a video signal with the resolution of the display unit 18 can be output. FIG. 1 shows the video data processing unit 16 and the control device 14 as separate elements of the surgical microscope system 10; however, the two units 14, 16 may also be configured as a common system component.

The surgical microscope system 10 also comprises an input unit 20, with which the user 5 can interactively change the magnification with which the object region 30 is to be presented on the display unit 18 continuously and/or step by step. In the exemplary embodiment of FIG. 1, this input unit 20 has a number of buttons, to be specific a button 21 for "increasing the zoom factor" and a button 22 for "reducing the zoom factor"; also provided is an operating possibility (button 23) "maximum zoom without loss of quality", by means of which the zoom factor can be set automatically.

The surgical microscope system 10 optionally comprises a sensor 25, with which a distance 26 of the user 5 from the display unit 18 can be measured. The sensor 25 may for example measure the distance 26 on the basis of an integrated camera. The distance 26 may alternatively also be entered in the control device 14 manually; this is recommendable in particular in the case of applications in which the display unit 18 is digital binoculars or a head-mounted display, with which there is generally a fixed viewing distance or scaling factor between the eyes of the user 5 and the display unit 18.

Figure 2:
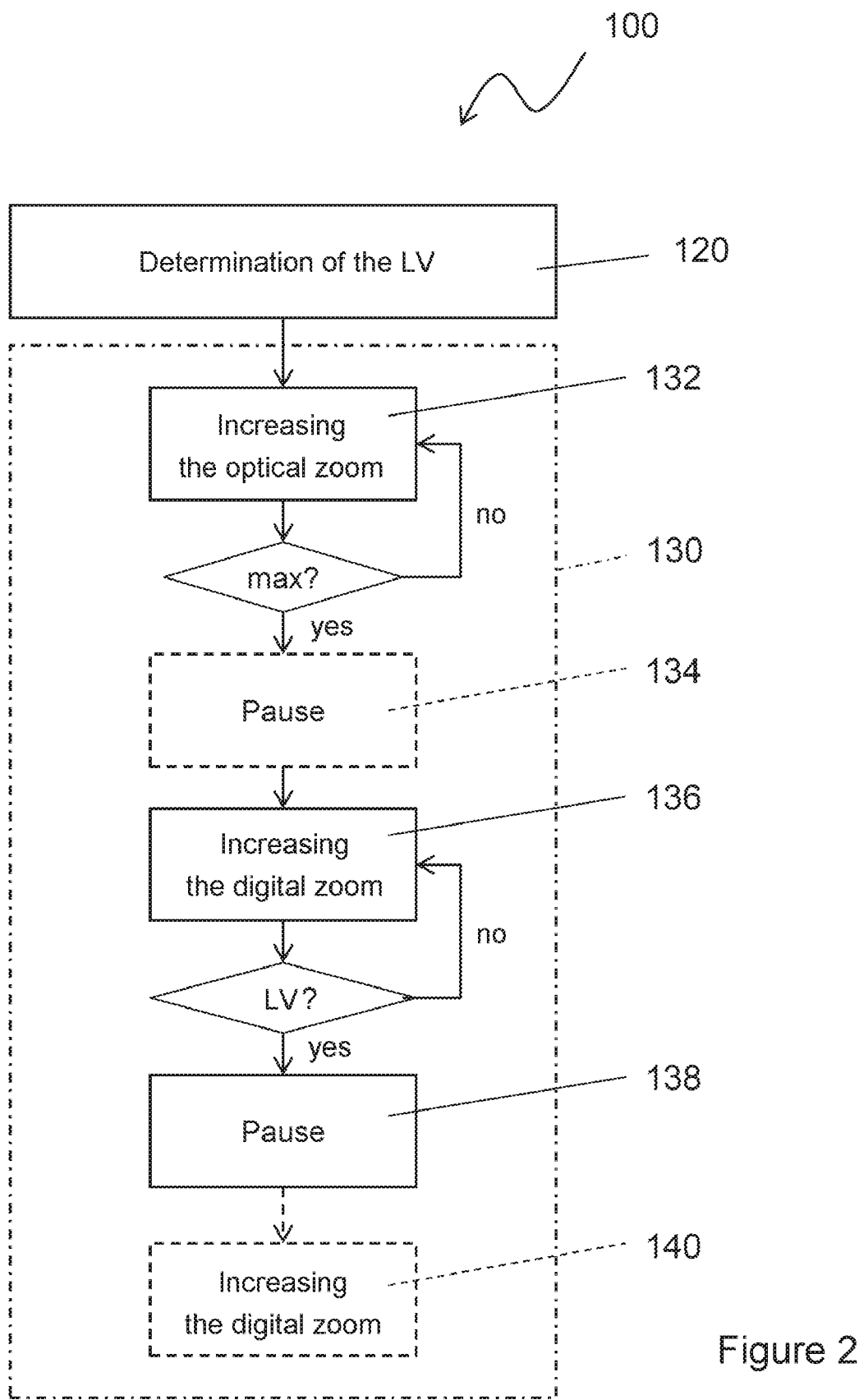
FIG. 2 shows a flow diagram of a method according to the invention for presenting images from the surgical microscope system of FIG. 1.

Schematically shown in FIG. 2 is a flow diagram of a method 100 with the aid of which an optimized presentation, specifically designed for the application situation at the time, of the images of the object region 30 recorded by means of the surgical microscope system 10 can be achieved on the display unit 18.

In this case, first, while taking into consideration the parameters
- size (and possibly number of pixels) of the display unit 18,
- the smallest size of structure that can be digitally resolved by the digital microscope in the object region 30 to be observed,
- the distance 26 of the user 5 from the display unit 18,
- optionally the visual acuity (vision) of the user 5, a "limit value of the magnification" (LV) is determined (step 120), a value that corresponds to an optimum overall magnification with which the user 5 can just about comfortably make out the smallest structure details on the object surface 30 that are resolved by the digital recording unit 12 when viewing the display unit 18. If the display unit 18 is digital binoculars or a head-mounted display, the distance 26 is a value that is constant over time and is determined by the design of the display unit 18. If a fixed monitor is used as the display unit 18, the distance 26 is determined with the aid of measuring data of the sensor 25 and can change over time if the user 5 moves in relation to the monitor. In this case, the "limit value of the magnification" determined in step 120 must be adapted or corrected according to the position of the user 5 in relation to the monitor.

The overall magnification is in this case obtained as the product of the optical zoom factor and the digital zoom factor:

$$\text{Overall magnification} = (\text{optical zoom factor}) * (\text{digital zoom factor}).$$

If the user 5 wishes to view an object region 30 with the aid of the surgical microscope system 10, he first establishes which section of the object region 30 is to be displayed on the display unit 18. He then presses the zoom button 21, in order to obtain a magnified image of the chosen section of the object region 30 on the display unit 18; the magnification of the image to be presented is thereby increased iteratively (step 130).

Figure 3:
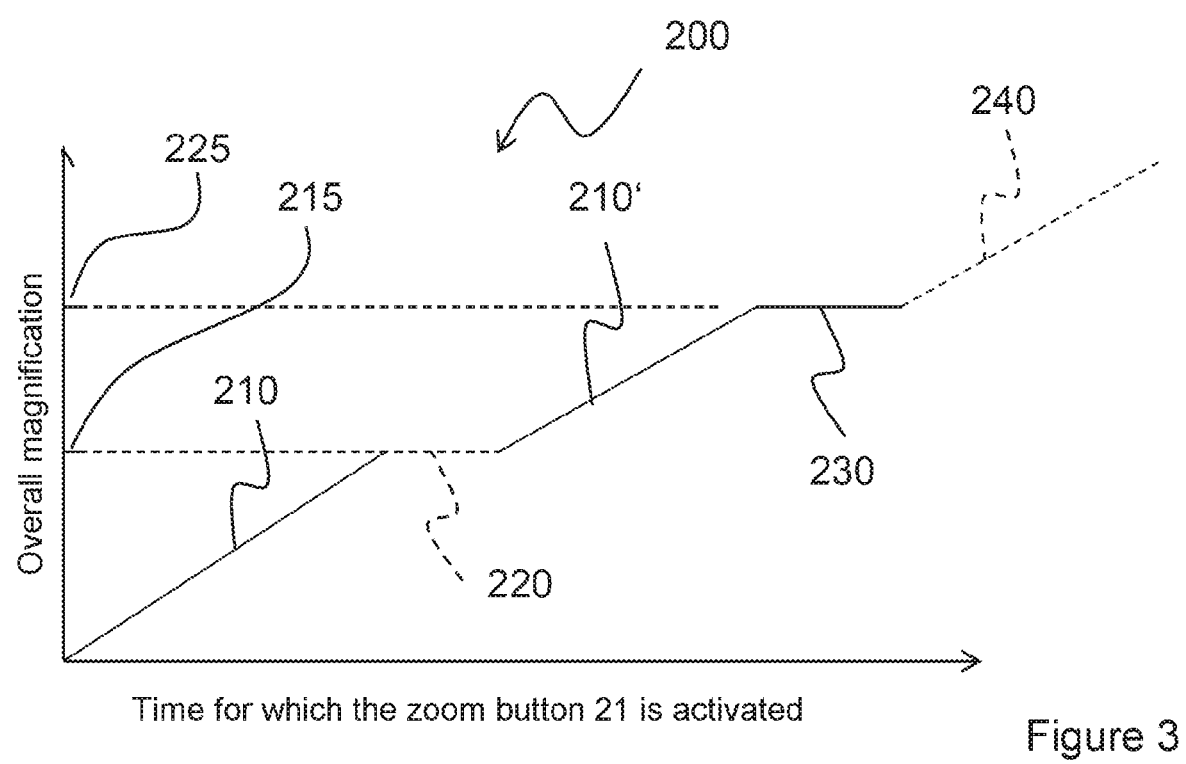
FIG. 3 shows a diagram of the (momentary) overall magnification of the image achieved by the method of FIG. 2 on a display unit as a function of the time for which a zoom button is actuated by the user.

FIG. 3 shows a diagram 200, in which an achieved (momentary) overall magnification is represented as a function of the time for which the zoom button 21 is actuated by the user 5. If the user 5 presses the zoom button 21 continuously, first, in a first (optical) zoom phase, the optical zoom factor is increased continuously or step by step (curve portion 210), until the maximum optical zoom factor 215 (achievable by the optical zoom of the recording unit 12) is reached (step 132 in the flow diagram of FIG. 2). When the maximum optical zoom factor is reached, there is (optionally) a first pause (curve portion 220), which signals to the user 5 that the optical zoom factor has reached its maximum value (step 134 in the flow diagram of FIG. 2). As an alternative or in addition to a pause, there could also be tactile feedback of the button/switch, i.e. a short vibration or a temporary resistance when the button is pressed. If the user 5 continues to press the zoom button 21, a digital zoom is subsequently activated in a second zoom phase (curve portion 210'), serving the purpose of making more details visible for the user 5 on the display unit 18 (step 236 in the flow diagram of FIG. 2). In this case, the digital zoom factor is increased iteratively until the overall magnification has reached the "limit value of the magnification" (LV) 225 described above, determined by situative parameters. When this magnification value is reached, there is a further pause (curve portion 230). This further pause 230 indicates to the user 5 that the situationally optimum magnification has been reached and that no additional object details will be made visible by increasing the digital zoom further, but instead there will be a visible loss of image quality (step 138 in the flow diagram of FIG. 2).

Optionally, by further pressing of the zoom button 21, the user 5 can indeed actively increase the digital zoom further (curve portion 240, step 140), but this does not lead to any further usable increase in the resolution of the image presented on the display unit 18. This possibility of a further (unproductive) increase in the magnification is advantageously suppressed by the system.

If the user 5 moves in space, the distance 26 of the user 5 from the display unit 18 may change—if a spatially fixed monitor is used as the display unit 18—and the magnification presented must be readjusted in order to be set optimally for the user 5, and in particular for the position of the latter. In such a case, to accompany the process that (maximum) resolution or density of detail of the display unit 18 that can be seen or can be used as a maximum for the user 5 is determined in each case on the basis of a measurement of the distance 26 of the user 5 from the display unit 18 that is determined by the sensor 25. If details that are effectively not visible for the user 5 are presented on the display unit 18, the optical magnification of the recording unit 12 is reduced and compensated by the digital zoom in such a way that the overall magnification, and consequently the object section presented, remains unchanged. The optical magnification is in this case chosen in such a way that only such object details that can actually be perceived by the eyes of the user 5 are optically resolved and digitally registered by the image sensor 13.

While in the diagram of FIG. 3 the pause 230 corresponding to "optimum magnification" takes place when the previously calculated "limit value of the magnification" 225 is reached, it is also possible not to interrupt the iterative digital zooming process until a higher magnification than that which would correspond to the resolving power of the user's eye has been reached. The image is in this case therefore magnified somewhat more than would actually be the optimum.

By actuating the "negative zoom button" 22, the user 5 can if need be reduce the magnification, and in this way make a greater section of the object region 30 visible on the display unit 18.

In an alternative zooming method, the user 5 presses the operating button 23, which is given an automatic function "maximum zoom without loss of quality". In this case, the surgical microscope system 10 sets the "optimum overall magnification" by setting a corresponding advantageous combination of the optical zoom factor and the digital zoom factor.

The invention claimed is:

1. A method for recording and providing digital images using a digital surgical microscope system, the method comprising:
   providing, within the digital surgical microscope system, a monitor that is remote from a user using the digital surgical microscope system by a distance, and at least one image recording unit comprising an image sensor;
   recording a magnified video image of an object region by the image sensor in the at least one image recording unit;
   displaying, in at least certain regions on the monitor, the image recorded by the image sensor; and
   adjusting a limit value of the magnification of the image displayed on the monitor using situative parameters, wherein the situative parameters comprise at least the distance of the user from the monitor and the limit value corresponds to an optimum overall magnification with which the user can make out smallest structure details on the object region that are resolved by the image sensor when the user is viewing the monitor.

2. The method of claim 1, wherein the situative parameters further comprise user-specific parameters.

3. The method of claim 2, wherein the user-specific parameters further comprise the vision of the user.

4. The method of claim 1, further comprising:
   increasing an optical zoom factor of the image recording unit iteratively until a maximum value is reached, wherein the optical zoom factor is increased upon activation of a zoom function; and
   increasing a digital zoom factor of the image recording unit iteratively until the image displayed on the monitor is provided with an overall magnification that corresponds to the limit value of the magnification.

5. The method of claim 1, further comprising:
   determining the limit value of the magnification; and
   increasing the magnification iteratively by a combination of an optical zoom and a digital zoom until the limit value of the magnification is reached.

6. The method of claim 1, further comprising:
   determining with at least one sensor the distance of the user from the monitor.

7. The method of claim 1, further comprising:
   entering, manually by the user, the distance of the user from the monitor.

8. A digital surgical microscope system comprising:
   at least one image recording unit comprising an image sensor, the image sensor configured to record an image;
   a monitor remote from a user using the digital surgical microscope system by a distance and for displaying, at least in certain regions, the image recorded by the image sensor;
   a video data processing unit configured to provide image data for displaying the image by the monitor, wherein the video data processing unit is configured to set a limit value of a magnification by using situative parameters, wherein the situative parameters comprise the distance of the user from the monitor and the limit value corresponds to an optimum overall magnification with which the user can make out smallest structure details on an object region that are resolved by the image sensor when the user is viewing the monitor.

9. The digital surgical microscope system of claim 8, wherein the situative parameters comprise user-specific parameters.

10. The digital surgical microscope system of claim 9, wherein the user-specific parameters comprise the vision of the user.

11. The digital surgical microscope system of claim 8, further comprising:
    at least one sensor configured to determine the distance of the user from the monitor.

12. A method for recording and providing digital images using a digital surgical microscope system, the method comprising:
    providing, within the digital surgical microscope system, a monitor that is remote from a user using the digital surgical microscope system by a distance, and at least one image recording unit comprising an image sensor;
    recording a magnified video image of an object region by the image sensor in the at least one image recording unit;
    displaying, in at least certain regions on the monitor, the image recorded by the image sensor;

adjusting a limit value of the magnification of the image displayed on the monitor using situative parameters, the situative parameters including at least a distance of the user from the monitor and the limit value corresponding to an optimum overall magnification with which the user can make out smallest structure details on the object region that are resolved by the image sensor when the user is viewing the monitor;

increasing an optical zoom factor of the image recording unit iteratively until a maximum value is reached, wherein the optical zoom factor is increased upon activation of a zoom function; and increasing a digital zoom factor of the image recording unit iteratively until the image displayed on the monitor is provided with an overall magnification that corresponds to the limit value of the magnification.

13. The method of claim 12, further comprising:

determining the distance of the user from the monitor with at least one sensor.

* * * * *